Aug. 30, 1938.   E. E. DAVIS   2,128,286
SKID CHAIN DEVICE
Filed May 19, 1937   2 Sheets-Sheet 1

INVENTOR
EDGAR E. DAVIS
BY
Richards & Geier
ATTORNEYS

Aug. 30, 1938.  E. E. DAVIS  2,128,286
SKID CHAIN DEVICE
Filed May 19, 1937   2 Sheets-Sheet 2

INVENTOR
EDGAR E. DAVIS,
BY
Richards & Geier
ATTORNEYS

Patented Aug. 30, 1938

2,128,286

UNITED STATES PATENT OFFICE 2,128,286

SKID CHAIN DEVICE

Edgar E. Davis, Belleville, N. J.

Application May 19, 1937, Serial No. 143,431

1 Claim. (Cl. 152—213)

It is an object of my invention to provide a device which will readily enable the attachment of skid chains, especially of the emergency type, to automobile wheels. The modern automobile wheel provides very little space between the spokes. In view of this fact, it becomes a very difficult task to thread the strap of an emergency chain through this limited space, during the ordinary application of the chains to the wheel. The task of applying emergency chains to wheels as they are now constructed, is difficult, and furthermore, renders the individual dirty, due to manipulation of the chains beneath the car fenders. With my device, I simplify the task so that the matter of applying the chains, especially threading the strap of the chain through the space between spokes, is readily accomplished. These and other objects are accomplished by my invention, which is illustrated in the attached drawings, in which:

Fig. 1 is a side elevational view of my device.

Figs. 2 and 3 are fragmentary detail views, looking in the direction of arrows 2—2 and 3—3 of Fig. 1 respectively.

Fig. 4 is a side elevational view partly in section, of a modification of my invention, whereby the feature of adjustability is accomplished.

Figs. 5 and 6 are fragmentary views, looking in the direction of arrows 5—5 and 6—6 of Fig. 4.

Figure 1:
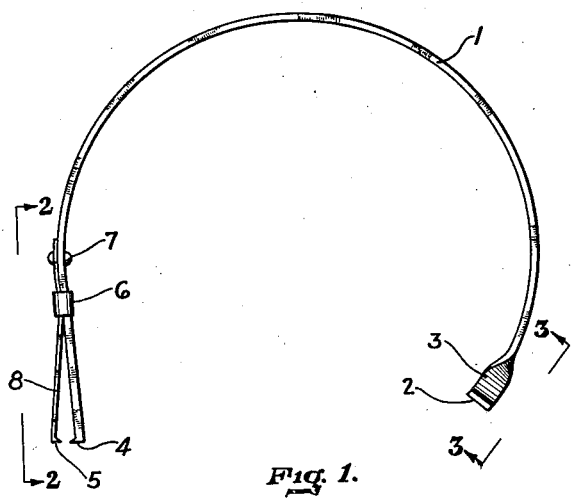
Figure 2:
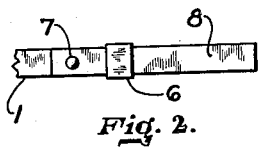
Figure 3:
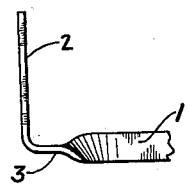

As shown in Fig. 1, my invention comprises a loop member 1, made of a substantial rigid material having a handle member 2 at one end, twisted at right angles to the member 1, by the connection 3. The opposite end of the member 1, terminates in a clamping edge 4. In this particular instance, the edge 4 is straight. Attached to the member 1 by a rivet 7, is a resilient spring-like member 8. The lower end of the member 8 has a cooperating clamping edge 5. This edge is also preferably straight, so as to engage with the edge 4 of member 1. The spring-like member 8 normally assumes the position illustrated in Fig. 1, but by sliding the ring-like member 6 downwardly thereon, the edge 5 is brought into clamping engagement with the edge 4.

Figure 4:
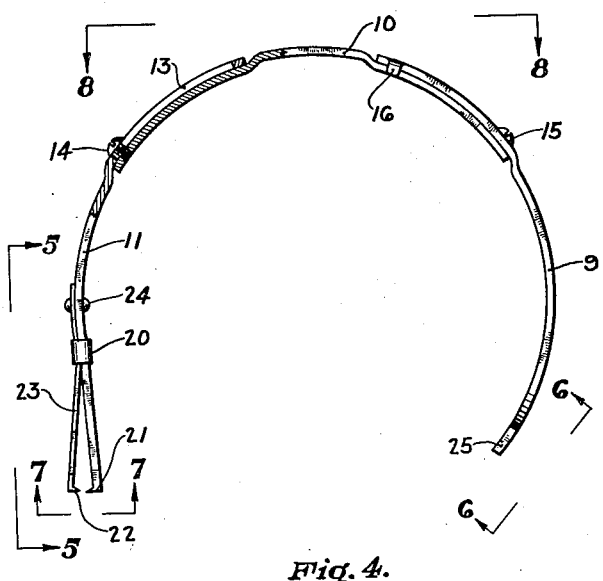
Figure 5:
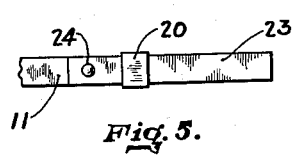
Figure 9:
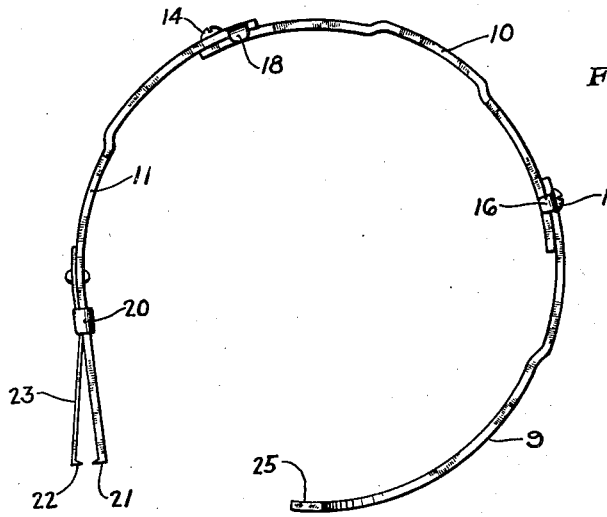
Fig. 9 is a view similar to Fig. 4, but showing the device adjusted to an extended position.

In the modification shown in Fig. 4, the device comprises the three sections 9, 10 and 11. The intermediate section 10, has threaded thereon, a pair of bolts 14 and 15. The members 9 and 11, have respective slots 12 and 13 which engage with the heads of the bolts 15 and 14. The ears 16 and 17 on member 9, and 18 and 19 on member 11, act as a guide means during the adjustment of the device. The adjustment of the device is quite obvious, it being merely necessary to loosen the bolts 14 and 15, and by means of the slotted connections 12 and 13, and the guide ears 16 to 18, the device may be extended in its overall length as shown in Fig. 9.

Figure 6:
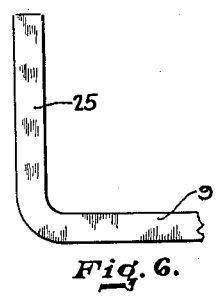
Figure 7:
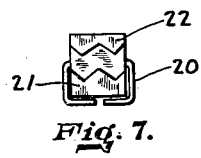
Fig. 7 is an enlarged view of the clamping end of my device, looking in the direction of arrows 7—7 of Fig. 4.
Figure 8:
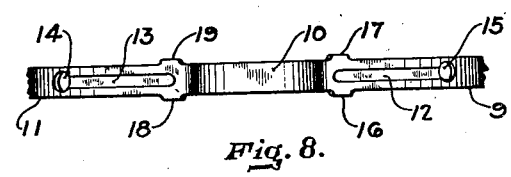
Fig. 8 is a fragmentary plan view taken in the direction of arrows 8—8 of Fig. 4.

The handle member 25 in Fig. 6 is shown as bent at right angles to member 9. The opposite end of the device of Fig. 4 has a clamping means similar in construction to that shown in Fig. 1. Thus there is a resilient spring-like member 23, which is brought into clamping position by means of the slidable ring 20. The spring-like member is connected to the member 11 by means of a rivet 24. Instead of making the edges 21 and 22 straight as the corresponding edges 4 and 5 in Fig. 1, I prefer to give these edges cooperating teeth-like formations as illustrated in Fig. 7.

Figure 10:
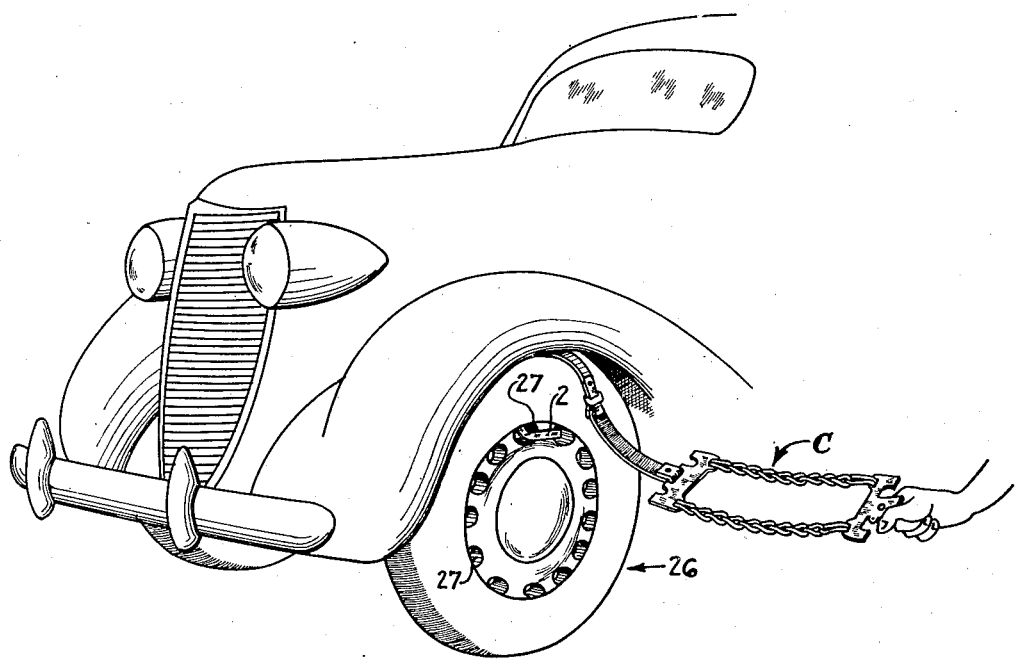
Fig. 10 is a perspective view illustrating the use of my invention in conjunction with the application of emergency skid chains to an automobile wheel.

In the use of the invention as shown by Fig. 10, it is obvious that it is merely necessary to insert the clamping end of the device inwardly through the space 27 of the wheel 26. Due to the shape of my device, the further insertion of the device through this space, will cause the clamping end to travel around the inner side of the tire and over the top thereof, as clearly illustrated in Fig. 10. The arm 2 of the device, abuts against the outer surface of the spokes. When the device is in its proper position for use, the strap of the emergency chain C is then engaged by the clamping end of the device. The operator then grips the handle portion 2, pulling the same outwardly as though to remove the device. With the removal of the device, the strap of the emergency chain C will be threaded through the space 27, between the spokes of the wheel. Having this strap in hand, the operator can readily apply the chains to the vehicle wheel.

It is apparent that my invention has a very desirable use, in so far as it simplifies a task which has heretofore been unpleasant and difficult.

It is not my intention to limit the invention to the specific disclosure illustrated, but rather to include all equivalent instructions covered by the scope of the following claim.

I claim:

A device for the attachment of emergency skid chains having a strap to an automobile wheel, comprising bowed members adjustably associated with each other by pin and slot connections and having guide means to aid in the extension thereof, said assembled bowed members forming a unit conforming in shape approximately to that of the cross-sectional shape of the tire on the wheel, one end of the unit having a handle at right angle thereto so as to engage with the outer surface of the wheel spokes when said bowed unit is inserted therebetween, the opposite end of the unit having a clamping means thereon for engagement with the strap of the emergency skid chain so that the strap can be drawn over the tire and between the spokes of the wheel.

EDGAR E. DAVIS.